United States Patent [19]
Weinberger

[11] Patent Number: 5,376,784
[45] Date of Patent: Dec. 27, 1994

[54] HYBRID ORGANIC-INORGANIC BISTABLE NONLINEAR OPTICAL DEVICE

[76] Inventor: Lester Weinberger, 9039 Sligo Creek Pkwy. Apt. 906, Silver Spring, Md. 20901

[21] Appl. No.: 78,057
[22] Filed: Jun. 17, 1993
[51] Int. Cl.$^5$ .............................................. H01J 40/14
[52] U.S. Cl. ................................ 250/214 LS; 377/102
[58] Field of Search ................. 250/214.1, 214 LS; 377/102; 257/14, 18, 21

[56] References Cited

U.S. PATENT DOCUMENTS

| | | | |
|---|---|---|---|
| 3,447,922 | 6/1969 | Weinberger | 204/181 |
| 3,448,028 | 6/1969 | Weinberger | 204/181 |
| 3,448,029 | 6/1969 | Weinberger | 204/181 |
| 3,448,030 | 6/1969 | Weinberger et al. | |
| 4,546,244 | 10/1985 | Miller | 250/211 J |
| 4,877,952 | 10/1989 | Halemane et al. | 250/214 LS |
| 5,093,565 | 3/1992 | Lentine | 250/214 LS |

OTHER PUBLICATIONS

So et al. "Organic–on–Inorganic Photodetector" IEEE Trans. on Electron Dev., vol. 36, No. 1 Jan. 1989 pp. 66–69.
So et al. "Evidence for Exciton Confinement in Crystalline Organic Multiple Quantum Wells" Physical Review Letters vol. 66 No. 20 May 1991 pp. 2649–2652.
Weinberger et al "Preparation and Characterization of 8,13-Dioxodinaptho[2,1-b:2',3'-d]furan-6 carboxamides" Journalof Heterocyclic Chemistry vol. 6, No. 5 1969 pp. 761–764 (month unknown).

Primary Examiner—David C. Nelms
Attorney, Agent, or Firm—William D. Hall

[57] ABSTRACT

This invention describes a dual mode optical switching device comprising organic quantum well regions interfacing with inorganic semiconductors. Each mode generates excitons and a photocurrent in their respective quantum well regions in response to incident control beams of different wavelengths of light. The photocurrents in each mode independently modulate the transmission of the lower frequency signal beams. Multiple hybrid organic/inorganic quantum well optical devices can be crafted into optical logic gates by using light impulses in a manner that is analogous to the way electronic gates are used in electronic systems. These devices can also perform as optical switches and optical interconnects between electronic elements. Thus the processing units are electronic and the connections between them are optical, comprising an opeoelectric system with higher data throughput that will exceed electronic systems. Arrays of hybrid organic/inorganic quantum well optical devices create the opportunity for parallel processing.

22 Claims, 2 Drawing Sheets

FIG. 1
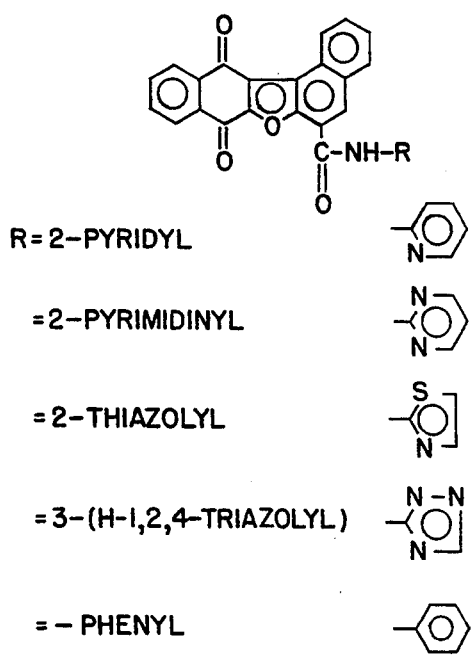
R = 2-PYRIDYL
= 2-PYRIMIDINYL
= 2-THIAZOLYL
= 3-(H-1,2,4-TRIAZOLYL)
= - PHENYL
FIG. 3
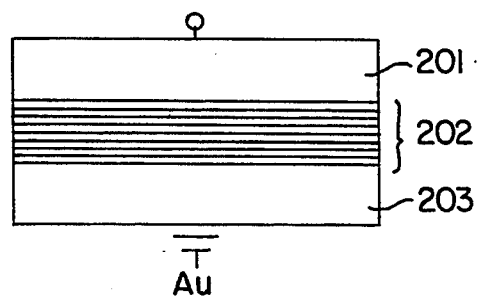
FIG. 4
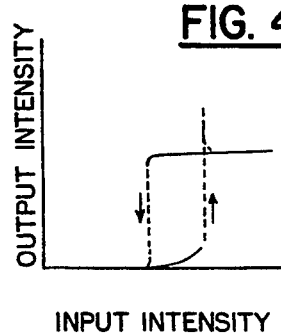
FIG. 2A   FIG. 2B
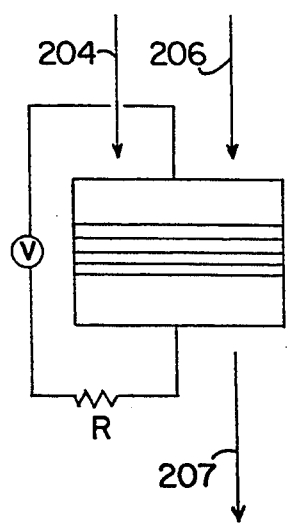 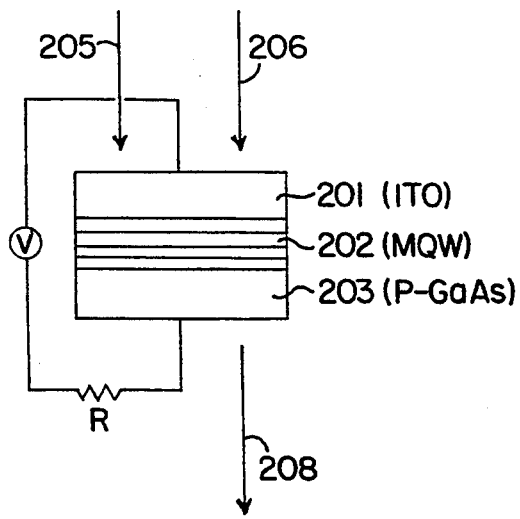

FIG. 5
TABLE 1

UNIT CELL DIMENSIONS a = 19.95 + .01A    b = 14.28 + .02A    c = 7.47 + .008A $\alpha$ = 113.80 + .05°    $\beta$ = 102.66 + .05°    $\Upsilon$ = 85.28 + .05°

FIG. 6
TABLE 2

INFRARED SPECTR $CM^{-1}$

| R | NH STRETCH | C=O STRETCH |
|---|---|---|
| 2-PYRIDYL | 3406 SHARP | 1667.0<br>1675.5 |
| 2-PYRIMIDINYL | 3415 SHARP | 1675: 1700 SHOULDER 1705 |
| 2-THIAZOLYL | 3398 SHARP | 1670 SHOULDER 1675 |
| 3-(1H 1,2,4-TRIAZOLYL) | 3240 BROAD | 1675 BROAD |

HYBRID ORGANIC-INORGANIC BISTABLE NONLINEAR OPTICAL DEVICE

TECHNICAL FIELD

This invention describes a hybrid nonlinear organic-inorganic quantum well semiconductor device for optical switching.

BACKGROUND OF THE INVENTION

Self Electrooptic Effect Devices (SEEDs) using InGaAs/AlGaAs multiple quantum wells as optical switching devices have been developed by AT&T. U.S. Pat. No. 4,546,244 issued to D. A. B. Miller, describes these devices which are fundamental for AT&T's bid for an optoelectronic computer. These optically nonlinear devices must operate sequentially to produce the bistable switching demands for Boolean Logic operations.

In Phys. Rev. Lett., vol. 66, No. 20 (1991), F. F. So and S. R. Forrest describe the preparation and quantum mechanics of an organic multiple quantum well system.

SUMMARY OF THE INVENTION

This invention is a dual wave hybrid organic-inorganic optical switching device. Low switching energy is accomplished by the use of organic quantum wells generating excitons and creating a photocurrent by the absorption of light at one wavelength which causes a change in optical absorption of a second wavelength of different frequency.

BRIEF DESCRIPTION OF THE DRAWINGS

FIG.1 shows the chemical structures of the organic materials used for the quantum wells.

FIGS. 2A and 2B considered as part of one system form is a cross-sectional diagram of the dual mode device showing the optoelectronic circuit.

FIG.3 is a cross-sectional diagram showing the semiconductor layers.

FIG.4 graphically represents a characteristic curve for an optically bistable system.

FIG. 5 is Table 1, hereinafter referred to.
FIG. 6 is Table 2, hereinafter referred to.

DETAILED DESCRIPTION

Quantum wells are made with great difficulty and expense from multiple layers of the the group III-V gallium and arsenic inorganic semiconductor elements. The stringent requirement of lattice matching by deposition of multiple thin layers of semiconductor material is a serious barrier to the necessary confinement of excitons, the excited electron-hole pairs.

Inorganic molecules and crystals are held together by electrovalent or ionic bonds. Organic molecules are held together by the sharing of atomic orbitals between atoms. Weak electrostatic attractions termed Van der Waals forces, bond organic molecules to form crystals. This can allow strain relaxation between alternate layers of the crystals derived from select organic molecules.

Each of the Hybrid Organic-Inorganic Bistatic Optical Devices (HOBODs) contain its own wavelength control pulses which eliminate optical crosstalk and concurrently allow independent operation of each member of an array.

Another advantage of the HOBODs is that a wide range of wavelengths can be used for the control pulse. Furthermore, the vast number of organic compounds and polymers containing conjugated pi molecular orbital systems can be matched to a particular wavelength for the control pulse.

Organic molecules and polymers are much easier to fabricate than inorganic materials. This mitigates many of the severe constraints which are current in the manufacture of inorganic semi-conductor materials.

FIG. 1 shows the structure of N-2''-pyridyl-8,13-dioxodinaphtho [2,1-b:2'3'-d]furan-6-carboxamide, R=2-pyridyl This material absorbs blue light and becomes highly photoconductive. Substituting a halogen atom for one of the hydrogens in the pyridyl ring also sustains high conductivity.

Replacing the nitrogen atom in the pyridyl ring with a carbon atom creates the phenyl group, R=phenyl. This results in a drastic reduction of photoconductivity. Photoconductivity is restored if halogen atom, i.e. bromine, or alkoxy groups replace a hydrogen atom in the phenyl group.

Single crystals have been obtained only for the pyridyl compound. Table 1 (FIG. 5) show the unit cell dimensions as the result of X-ray diffraction studies. The unit cell volume is 1901 Å. The number of molecules in the unit cell is 4. The density is 1.46 g/cm$^3$ There is no evidence of polymorphism. Infrared measurements (table 2 FIG. 6) show no indication of dimerization or hydrogen bonding; thus none of the molecules in the unit cell are bound by any forces stronger than van der Waals.

FIGS. 2A and 2B show the embodiment of the invention. Both FIGS. 2A and 2B are identical but use different photonic energies for their control beams. Indium tin oxide (ITO) 201, is the transparent conducting electrode. Alternate layers of the pyridyl and phenyl carboxamides 202, as described in FIG. 1 comprise the multiple quantum wells (MQWs), p-GaAs 203, is the inorganic semiconductor. Other semiconductors on which organic materials have been grown are Si and InP. Both devices have identical voltage and resistor sources.

The voltage across layers 201, 202 and 203 applies an electric field to those parts.

Voltage is applied across the photodiode perpendicular to the plane of the quantum well structures creating a photocurrent from the electron-hole pairs. The resistor acts as an electrical load and the voltage across the diode drops causing an increase in optical absorption thus generating more carriers and increasing the photocurrent. This is the positive feedback.

In the FIG. 2 A device a high energy photonic beam, of blue light of 457 nm, is readily absorbed by the alternating layers of the yellow carboxamides, creating the energetic electron-hole pairs or excitons. This is the control beam and it is not transmitted by the GaAs. The near infrared 850 nm. signal beam's transmission through the device is controlled by the absorption of this input beam. The collateral device, of FIG. 2B, uses a blue-green 528 um input control beam.

When the light intensity of the control beam is high, there is a decrease in the electric field and the quantum well strongly absorbs the signal beam and the transmitted light from this beam sharply decreases. This constitutes the switching from the transmitting state to the blocking state. When the control beam intensity input is lowered the switchback occurs. This constitutes the bistatic function of the device. Low intensity of the input beam increases transmission of the signal beam; high input reduces transmission.

FIG. 3 is a side view showing layering of the materials for the device. The alternating layers of the pyridyl and phenyl carboxamides consisting of equal thickness are grown by the ultra-high vacuum techniques, similar to those used for epitaxial growth of inorganic structures. The film thickness for each layer Is 12 Å, and a total of 24 periods are deposited. Film growth is monitored by an oscillating quartz-crystal system (Leybold-Heraeus Inficon IC6000). The 4,000 Å of transparent indium-tin-oxide 201, is formed by sputtering a mixture of $In_2O_3$ and SnO at room temperature at $10^{-3}$ torr in an argon atmosphere onto the top organic film surface.

The resistors in FIGS. 2A and 2B may be replaced by a PN junction photodiode. An independent light source directed at the diode would generate additional photocurrent. A PNP phototransistor is more advantageous because the photocurrent generated by the light absorption is amplified making the device more sensitive to the control beams, 204 and 205. A photoconductor may also be used as a an adjunct photocurrent generator.

The, binary device described in FIGS. 2A and 2B can be configured into a two dimensional array. The device can also function as a spatial light modulator.

Each module, A and B, of the dual control beam device, FIG. 2, exhibits optical bistability. There are two stable output intensity levels, low and high transmittance, for a given input intensity. FIG. 4 demonstrates the classic curve for either bistable device, A or B in FIG. 2. The combinations of low and high transmittances can be read to create AND; OR logic gates. In FIG. 2, a low intensity output beam, 207, in device A in contrast to a high intensity beam 208 in device B signifies a binary 1. Conversely, a high intensity beam, 207, in device A and a low intensity beam 208 in device B signifies a 0.

If modules A and B have different quantum well compositions then identical control and signal beams may be used to create the AND/OR logic gates.

An effective waveguide may be achieved by directing a beam of near infrared frequency parallel to the plane of the quantum wells. However, layer thicknesses have to be altered to match mode resonances for optimum light propagation.

What is claimed is:

1. An optical device comprising a quantum well of organic chemical composition interfacing with an inorganic semiconductor, in series with a power source and an element having electrical resistance, with an incident control beam of one frequency and an incident signal beam of a different frequency.

2. An optical device as defined in claim 1 comprising a control beam of light at one frequency incident upon the said device creates a photocurrent in the quantum well region of said device altering the electric field across the quantum well region thereby controlling the optical absorption and transmission of a second signal beam of light incident upon said device, said second signal beam having a frequency different from the frequency of said control beam.

3. An optical device as defined in claim 1 wherein said quantum well has at least one layer that includes a carboxamide.

4. An optical device as defined in claim 1 wherein said quantum well comprises alternate layers of pridyl and phenyl carboxamides.

5. An optical device as described in claim 1, wherein said inorganic semiconductor has a silicon substrate.

6. An optical device as described in claim 1 wherein said element is a book.

7. An optical device as described in claim 1 wherein said element is a p-i-n photodiode responsive to light for generating a photocurrent.

8. An optical device as described in claim 1 wherein a photoconductor is responsive to light for generating a photocurrent.

9. A device for changing the amount of light transmitted through an optical element, comprising:
a first source of light for illuminating said element,
a second source of light for illuminating said element,
said optical element including an inorganic semiconductor and having a quantum well of organic chemical composition interfacing with said semiconductor, said optical element having light absorbing characteristics and comprising means for increasing said light absorbing characteristics when said element is illuminated by said first source, and
means for controlling said first source of light to vary the light transmitting characteristics of said element and thereby vary the amount of light from said second source that is transmitted by said element,
the light from said first source having a wavelength that enables that light, when applied to said element, to increase said absorbing characteristics; and the light from said second source having a wavelength that results in increased absorption, by said element, of light from said second source, when light from said first source is applied to said element.

10. A device as defined in claim 9 wherein said light from said first source has one frequency and the light from said second source has a different frequency.

11. A device as defined in claim 9 in which said organic chemical composition includes an electrically photosensitive material.

12. A device as defined in claim 9 in which said organic chemical composition comprises material as shown below:

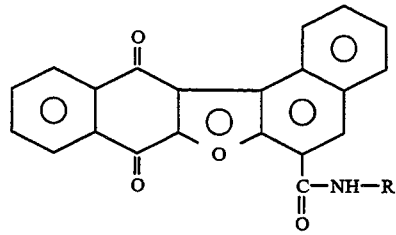

where R=a heterocyclic ring.

13. A device as defined in claim 9 in which said organic chemical composition comprises material as shown below:

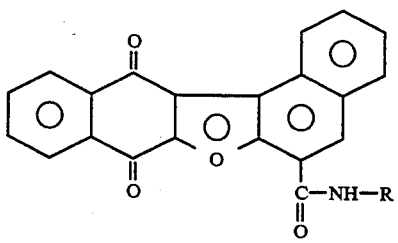

Where R=the pyridyl ring containing at least one or more electron withdrawing atoms or groups.

14. A device as defined in claim 9 in which said organic chemical composition comprises material as shown below:

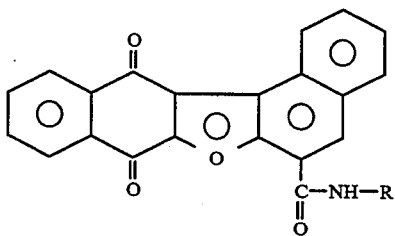

Where R=the pyridyl ring containing one or more electron donating atoms or groups.

15. A device as defined in claim 9 in which said organic chemical composition comprises:
N-2″-pyridyl-8,13-dioxodinaphtho[2,1-b:2′,3′-d]furan-6-carboxamide.

16. A device as defined in claim 9 in which said organic chemical composition comprises:
N-2″-bromopyridyl-8,13-dioxodinaphtho[2,1-b:2′,3′-d]furan-6-carboxamide.

17. A device as defined in claim 9 in which said organic chemical composition comprises:
N-phenyl-8,13-dioxodinaphtho[2,1-b:2′,3′-d]furan-6-carboxamide.

18. A device as defined in claim 9 having voltage applying means for applying a voltage across said quantum well and said semiconductor.

19. In a device as defined in claim 18, said voltage applying means, said quantum well and said semiconductor being connected in a series circuit that applies an electric field to said quantum well and to said semiconductor.

20. A device as defined in claim 9, in which said inorganic semiconductor is composed of a material opaque from light from said first source.

21. A device as defined in claim 20, in which said material is transparent at least partially opaque to light from said second source when light from said fist source illuminates said element.

22. A device as defined in claim 9, in which both said quantum well and said semiconductor are composed of material that is not transparent to said light from said second source when said element is illuminated by light from said second source,
said second source producing a beam of light that passes through both said quantum well and said inorganic semiconductor when said element is not illuminated by light from said first source.

* * * * *

UNITED STATES PATENT AND TRADEMARK OFFICE
CERTIFICATE OF CORRECTION

PATENT NO. 5,376,784

DATED     December 27, 1994

INVENTOR(S) Lester Weinberger

It is certified that error appears in the above-identified patent and that said Letters Patent is hereby corrected as shown below:

Claim 6, line 2 (col. 4, line 4), change "book" to -- load --

Signed and Sealed this

Eighteenth Day of April, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,376,784
DATED : December 27, 1994
INVENTOR(S) : Lester Weinberger It is certified that error appears in the above-identified patent and that said Letters Patent is hereby corrected as shown below:

Claim 21, line 2 (col. 6, line 23) cancel: "transparent" --.

Claim 21, line 4 (col. 6, line 24), change "fist" to: -- first --.

Claim 22, line 5 (col. 6, line 30) change "second" to: -- first --.

Signed and Sealed this

Eleventh Day of July, 1995

Attest:

BRUCE LEHMAN

*Attesting Officer*  *Commissioner of Patents and Trademarks*